United States Patent
Kim et al.

(10) Patent No.: US 9,766,468 B2
(45) Date of Patent: Sep. 19, 2017

(54) OPTICAL FILM

(71) Applicant: DONGWOO FINE-CHEM CO., LTD., Iksan-si, Jeollabuk-do (KR)

(72) Inventors: Sung Su Kim, Pyeongtaek-si (KR); Eun Young Kim, Seoul (KR); Jin Young Park, Pyeongtaek-si (KR)

(73) Assignee: DONGWOO FINE-CHEM CO., Ltd., Iksan-si (KR)

( * ) Notice: Subject to any disclaimer, the term of this patent is extended or adjusted under 35 U.S.C. 154(b) by 0 days.

(21) Appl. No.: 14/911,282

(22) PCT Filed: Aug. 20, 2014

(86) PCT No.: PCT/KR2014/007730
§ 371 (c)(1),
(2) Date: Feb. 10, 2016

(87) PCT Pub. No.: WO2015/030413
PCT Pub. Date: Mar. 5, 2015

(65) Prior Publication Data
US 2016/0187663 A1    Jun. 30, 2016

(30) Foreign Application Priority Data

Aug. 30, 2013 (KR) .......... 10-2013-0103906

(51) Int. Cl.
- *G02B 27/20* (2006.01)
- *G02B 27/00* (2006.01)
- *F21V 9/16* (2006.01)
- *G02F 1/1335* (2006.01)

(52) U.S. Cl.
CPC ........ *G02B 27/20* (2013.01); *F21V 9/16* (2013.01); *G02B 27/0018* (2013.01); *G02F 1/133502* (2013.01)

(58) Field of Classification Search
CPC ....... G02B 27/20; G02B 27/0018; F21V 9/16; G02F 1/133502
See application file for complete search history.

(56) References Cited

U.S. PATENT DOCUMENTS

| | | | |
|---|---|---|---|
| 2002/0091173 A1* | 7/2002 | Hashimoto | C09J 7/0217 522/150 |
| 2003/0160247 A1* | 8/2003 | Miyazawa | H05B 33/22 257/79 |
| 2006/0055853 A1 | 3/2006 | Murakami et al. | |
| 2010/0187975 A1* | 7/2010 | Tsukahara | G02B 6/0038 313/503 |
| 2011/0090670 A1 | 4/2011 | Ahn et al. | |
| 2011/0149549 A1* | 6/2011 | Miyake | F21V 7/22 362/84 |
| 2011/0315956 A1* | 12/2011 | Tischler | H01L 23/4985 257/13 |
| 2013/0092965 A1* | 4/2013 | Kijima | F21V 3/04 257/98 |

FOREIGN PATENT DOCUMENTS

| | | |
|---|---|---|
| JP | 2001-236181 A | 8/2001 |
| JP | 2005-258459 A | 9/2005 |
| KR | 10-2011-0042566 A | 4/2011 |
| KR | 10-1107532 B1 | 1/2012 |
| KR | 10-2012-0073444 A | 7/2012 |
| KR | 10-2012-0076035 A | 7/2012 |
| KR | 10-2013-0062865 A | 6/2013 |

OTHER PUBLICATIONS

English Translation KR1020130062865, Young et al, Jun. 13, 2013.*
English Translation KR1020120076035, Kyun et al, Jul. 9, 2012.*
International Searching Authority, International Search Report of PCT/KR2014/007730 dated Dec. 11, 2014.

\* cited by examiner

*Primary Examiner* — Mary Ellen Bowman
(74) *Attorney, Agent, or Firm* — Sughrue Mion, PLLC

(57) ABSTRACT

The present invention provides an optical film comprising a substrate including a photoluminescent material and an adhesive layer formed on one surface of the substrate. The optical film according to the present invention can not only enhance the visibility of a laser pointer when the laser pointer is pointed on a display having the optical film adhered thereto, but also suppresses the generation of bubbles when adhered to an antiglare-treated display having fine asperities on its surface to prevent the deterioration of visibility, and can also have an excellent transmissive clarity and be easily attached and detached.

12 Claims, No Drawings

OPTICAL FILM

CROSS REFERENCE TO RELATED APPLICATIONS

This is a National Stage of International Application No. PCT/KR2014/007730 filed Aug. 20, 2014, claiming priority based on Korean Patent Application No. 10-2013-0103906 filed Aug. 30, 2013, the contents of all of which are incorporated herein by reference in their entirety.

TECHNICAL FIELD

The present invention relates to an optical film. More particularly, the present invention relates to an optical film which can enhance the visibility of a laser pointer when the laser pointer is pointed on a display having the optical film adhered thereto, but also suppresses the generation of bubbles when adhered to an antiglare-treated display, and can also be easily detached.

BACKGROUND ART

Conventionally, in a presentation for a meeting or a conference, it is common to project data images on a screen or wall using a projector. At this time, the speaker generally performs the presentation while pointing to the screen, using a laser pointer which projects the laser beam at an arbitrary position on the projected image. In the case of screen projection using a projector, there were problems that, in the image projected, the contrast is either lowered or the image quality is deteriorated.

On the other hand, recently, liquid crystal display devices (LCD) and plasma display devices (PDP) which are large-sized, exceeding 70 inch are widely used. Therefore, it becomes possible to perform a presentation by directly displaying the image on the display itself, rather than projecting it with a projector. However, when performing a presentation by displaying an image on a display, the display is self-luminous and thus the laser beam projected by a laser pointer is not seen well. Also, in order to increase the display quality of the display itself, if the antiglare properties on the surface of the display are improved, the reflection of the transmitted light of the laser pointer is also suppressed. Therefore, a problem of the deteriorated visibility of the laser pointer may occur.

Recently, as disclosed in Japanese Patent Publication No. 2001-236181, the laser pointer is likely to be used for a pointing device for performing display instruction operations on the display and thus the visibility of the laser pointer becomes more and more important.

DISCLOSURE

Technical Problem

For resolving the aforesaid problems of the prior arts, it is an object of the present invention to provide an optical film which can enhance the visibility of a laser pointer when the laser pointer is pointed on a display having the optical film adhered thereto, but also suppresses the generation of bubbles when adhered to an antiglare-treated display, and can also be easily detached.

It is another object of the present invention to provide an image display device to which the optical film is attached.

Technical Solution

In order to achieve the above objects, the present invention provides an optical film comprising a substrate including a photoluminescent material and an adhesive layer formed on one surface of the substrate.

In an embodiment of the present invention, the adhesive layer has a storage elastic modulus G' at 23° C. of $1.0 \times 10^3$ Pa to $1.0 \times 10^6$ Pa.

In another embodiment of the present invention, the refractive index of the adhesive layer is larger than the refractive index of the substrate, and the difference in refractive index between the adhesive and the substrate is within a range of 0.1 to 0.3.

In addition, the present invention provides an image display device to which the optical film is attached.

In an embodiment of the present invention, the image display device has a transmissive clarity of at least 240.

Advantageous Effects

The optical film according to the present invention can enhance the visibility of the laser pointer when the laser pointer is pointed on a display having the optical film adhered thereto. Also, when adhered to the display in which fine asperities are present on the surface by antiglare treatment, the optical film can suppress the generation of bubbles, prevent the reduction of the visibility and exhibit an excellent transmissive clarity, and it can further be easily attached and detached.

Best Mode

Hereinafter, the present invention will be described in more detail.

The optical film according to an embodiment of the present invention comprises a substrate including a photoluminescent material and an adhesive layer formed on one surface of the substrate.

The substrate including a photoluminescent material emits light or is discolored through the stimulation by light. Therefore, when pointing a laser pointer on the display to which the optical film of the present invention is attached, a pointed portion emits light or is discolored by the light of the laser pointer, thereby enhancing the visibility of the laser pointer.

In an embodiment of the present invention, the substrate including a photoluminescent material is prepared by either applying a composition for forming a photoluminescent layer on the substrate or by mixing a composition for forming a photoluminescent layer with a composition for forming the substrate film.

In an embodiment of the present invention, any conventional optical transparent film known in the related art can be used without particular limitation thereof. However, among them, it is preferable to use a film having excellent transparency, mechanical strength, heat stability and the like.

The materials of the substrate used herein may include, for example, polyolefin-based resin, polyester-based resin, cellulose-based resin, polycarbonate-based resin, acryl-based resin, styrene-based resin, vinyl chloride-based resin, amide-based resin, imide-based resin, polyether sulfone-based resin, sulfone-based resin, polyether sulfone-based resin, polyether ether ketone-based resin, sulfide polyphenylene-based resin, vinyl alcohol-based resin, vinylidene chloride-based resin, vinyl butyral-based resin, allylate-based resin, polyoxymethylene-based resin, epoxy-based resin and the like.

The thickness of the substrate film is not limited to a certain range, but for example, a thickness of 5 to 200 μm and preferably 5 to 150 μm can be used. When the thickness of the substrate film is less than 5 µm, the mechanical strength of the film may be deteriorated, and when the thickness of the film exceeds 200 µm, the ductility is decreased and thus bubbles may be generated during attachment.

The photoluminescent material as used herein refers to a material which emits light or is discolored through the stimulation by light, and includes a material emitting light by ultraviolet rays, a material discolored by ultraviolet rays, a material emitting light by infrared rays, and the like.

The material emitting light by the ultraviolet rays is not particularly limited, and for example, a photoluminescent pigment, a photoluminescent dye, and the like can be used. These materials may be used alone or in any combination of two or more thereof.

The photoluminescent pigment may include, for example, an organic fluorescent pigment, an inorganic fluorescent pigment and the like. The photoluminescence dye may include, for example, a stilbene derivative-based dye, an imidazole derivative-based dye, a benzoimidazole-based dye, a coumarin derivative-based dye, a benzidine-based dye and the like.

The photoluminescent pigment and dye may be used in the form of solid, liquid, powder or the like, preferably powder.

The photoluminescent powder may include, for example, a lanthanide complex, an organic fluorescent substance, an inorganic fluorescent substance or the like, and preferably a lanthanide complex.

The lanthanide complex refers to a compound including a lanthanide-based metallic element. The lanthanide-based metallic element is not particularly limited, and for example, europium, terbium, dysprosium, samarium or the like, preferably europium can be used. The europium complex may include, for example, tris(dibenzoylmethane)mono(1,10-phenanthroline)europium(III) (hereinafter, referred to as Eu(DBM)$_3$Phen), tris(dinaphthylmethane)mono(1,10-phenanthroline)europium (III) (hereinafter, referred to as Eu(DNM)$_3$Phen), and the like.

The maximum excitation wavelength of the material emitting light by the ultraviolet rays is not particularly limited and for example, it may be 300 to 450 nm, and preferably 350 to 420 nm. This is related to the laser light of the laser pointer and the light source of the display used. When the wavelength of the light is greater than 450 nm and thus corresponds to a visible light region, it overlaps the light source of the display, thereby reducing the visibility.

The content of the material emitting light by the ultraviolet rays is not particularly limited, and for example, it may be included in an amount of 0.001 to 10 parts by weight, preferably 0.005 to 5 parts by weight, based on 100 parts by weight in total of the substrate. When the content of the material emitting light by the ultraviolet rays is within a range of 0.001 to 10 parts by weight, it is possible to exhibit a sufficient photoluminescence effect and the other components can be included at an appropriate amount, thereby maintaining a proper hardness.

The material discolored by the ultraviolet rays may be a photochromic dye, and for example, a spiropyran-based compound, a spirooxazine-based compound, a naphthopyran-based compound, a bismethylphenyl diphenyl butatriene, trinitro fluorenone and the like can be used.

The maximum excitation wavelength of the material discolored by the ultraviolet rays is not particularly limited and for example, it may be 300 to 450 nm, and preferably 350 to 420 nm. This is related to the laser light of the laser pointer and the light source of the display used. When the wavelength of the light is greater than 450 nm and thus corresponds to a visible light region, it overlaps the light source of the display, thereby reducing the visibility.

The content of the material discolored by the ultraviolet rays is not particularly limited, and for example, it may be included in an amount of 0.001 to 30 parts by weight, preferably 0.005 to 20 parts by weight, based, on 100 parts by weight in total of the substrate.

The material emitting light by the infrared rays is a material that absorbs infrared rays to emit a visible light and the material reversibly self-emits a visible light by the infrared rays only at the position where infrared light source is made incident.

Specific examples of the material emitting light by infrared rays may include one or more selected from, the group consisting of a two-photon absorption material, a second harmonic generation material, an upconversion material by excited state absorption, an upconversion material by sensitised energy transfer, an upconversion material by cooperative luminescence, an upconversion material by cooperative sensitisation and an upconversion material by photon avalanche.

The two-photon absorption material refers to a material which absorbs two photons simultaneously, and examples thereof may include, but are not limited to, PSPI (trans-4-[p-(pyrrolidinyl)styryl]-N-methylpyridinium iodide and the like.

The second harmonic generation material refers to a material exhibiting a non-linear optical phenomenon that are coupled to a new photon in which the energy of the photon absorbed in the material is doubled, and examples thereof may include, but are not limited to, a chalcone derivative and the like.

The upconversion material by excited state absorption may include $Y_3Al_5O_{12}$, $BaTiO_3$, $ZrO_2$, $Y_2O_3$ or ZBLAN in which trivalent lanthanide-based ions are doped, but it is not limited thereto.

The upconversion material by sensitised energy transfer may include $NaYF_4$, $BaY_2F_8$, $Y_2O_3$, $Gd_2BaZnO_5$, $La_2BaZnO_5$, glass or vitroceramic in which trivalent lanthanide-based ions and $Yb^{3+}$ are doped together, but it is not limited thereto.

The upconversion material by cooperative luminescence may include $LaF_3$:$Pr^{3+}$, or the like, but it is not limited thereto.

The upconversion material by cooperative sensitisation may include $SrCl_2$, $Cs_3Tb_2Br_9$, glass or PFBS (perfluorobutanesulfonate) in which $Yb^{3+}$ and $Tb^{3+}$ are doped together, but it is not limited thereto.

The upconversion material by photon avalanche may include $LaCl_3$, $LiYF_4$ or $YAlO_3$ in which trivalent lanthanide-based ions are doped, but it is not limited thereto.

The trivalent lanthanide-based ions used herein may include $Er^{3+}$, $Tm^{3+}$, $Ho^{3+}$ or $Pr^{3+}$, but it is not limited thereto.

The maximum excitation wavelength of the material emitting light by the infrared rays is not particularly limited, and for example, it may be 700 to 1600 nm. When the wavelength of light is less than 700 nm, this is a light source of visible light region and thus there is a problem that self light emitting of a material emitting light by the infrared rays is not visually recognized. When the wavelength of light exceeds 1600 nm, the wavelength of the self-emitted light is not a visible light and thus there is a problem that it is difficult to visually recognize the position of a point.

The content of the material emitting light by the infrared rays is not particularly limited, and for example, it may include 0.001 to 30 parts by weight preferably 0.005 to 20 parts by weight, based on 100 parts by weight in total of the substrate.

In an embodiment of the present invention, the adhesive layer is formed on one surface of the substrate and enable the optical film of the present invention to adhere to a desired position.

The optical film of the present invention may be attached to a transparent material such as glass or plastic or it may be used by placing only the optical film in front of the image display device only when necessary. However, in this case, a gap is formed between the image display device and the optical film to generate an interface reflection and moire, thereby decreasing the visibility. Therefore, the optical film of the present invention is preferably adhered to the visible side surface of the image display device.

The image display device typically comprises an antiglare layer or an antireflection layer on the viewing side surface to prevent the deterioration of visibility due to the reflection of external light. The antiglare layer forms fine asperities on the surface of the display through the transparent fine particles or the surface roughening to allow irregular reflection of external light source. However, the fine asperities may generate bubbles when the adhesive layer of the optical film of the present invention is attached, thereby causing a reduction of the visibility due to interface reflection.

In an embodiment of the present invention, the adhesive layer has a storage elastic modulus (G') at 23° C. of $1.0 \times 10^3$ Pa to $1.0 \times 10^6$ Pa.

By adjusting the storage elastic modulus of the adhesive layer as described above, it is possible to suppress the generation of bubbles, prevent the deterioration of visibility, and facilitate attachment and detachment. When the storage elastic modulus (G') is less than $1.0 \times 10^3$ Pa, the layer is soft and so the end falling may be generated, and when the storage elastic modulus (G') exceeds $1.0 \times 10^6$ Pa, bubbles are generated during attachment and thereby the visibility may be deteriorated.

In a further embodiment of the present invention, the refractive index of the adhesive layer is larger than the refractive index of the substrate, and the difference in refractive index between the adhesive and the substrate is within a range of 0.1 to 0.3.

By maximizing the difference in refractive index between the adhesive layer and the substrate to increase the interfacial reflection, it is possible to further improve the visibility of the laser pointer.

The adhesive layer may be formed using an adhesive composition comprising an adhesive resin, a crosslinking agent and an additive.

The adhesive resin is a resin having an adhesive strength that can act as an adhesive, and specific examples thereof may include conventional polymers such as acryl-based copolymer, urethane-based copolymer, natural rubber, styrene-isoprene-styrene (SIS) block copolymer, styrene-butadiene-styrene (SBS) block copolymer, styrene-ethylenebutylene-styrene (SEBS) block copolymer, styrene-butadiene rubber, polybutadiene, polyisoprene, polyisobutylene, butyl rubber, chloroprene rubber, silicone rubber or the like. Preferably, acryl-based copolymer, urethane-based copolymer, or silicone rubber can be used.

Examples of the acryl-based copolymer may include a copolymer of (meth)acrylate monomer having 1 to 14 carbon atoms in the alkyl group and monomers having crosslinkable functional groups.

Examples of the urethane-based copolymer may include urethane acrylate.

Examples of the silicone rubber may include polyorganosiloxane, polydimethyl siloxane, and the like.

The crosslinking agent is used to enhance the cohesiveness of the adhesive resin by appropriately crosslinking the acryl-based copolymer, and examples thereof may include an isocyanate compound, an epoxy compound, a melamine-based resin, an aziridine-based compound and the like, and preferably an isocyanate compound or an epoxy compound. These can be used alone or in any combination of two or more thereof.

As the additive, a resin providing adhesion, an antioxidant, a corrosion inhibitor, a levelling agent, a surface lubricant, a dye, a pigment, a defoaming agent, a filling agent, a light stabilizer and the like can be used in order to adjust an adhesive strength, a cohesiveness, a viscosity, an elastic modulus, a glass transition temperature and the like as required depending on the application.

The adhesive layer can be formed by a method for coating the adhesive composition on the substrate.

This coating method is not particularly limited as long as it is a method typically used in the art, and for example, a method such as a bar coater, an air knife, a gravure, a reverse roll, a kiss roll, a spray, a blade, a die coater, a casting or a spin coating can be used.

The thickness of the adhesive layer is preferably 6 to 200 μm and more preferably 6 to 100 μm. When the thickness is less than 6 μm, it may be difficult to buffer the impact generated from the outside and especially when adhered to the antiglare treated film, bubbles are generated, thereby deteriorating the visibility.

In an embodiment of the present invention, the adhesive layer has an initial adhesive strength of 0.005 to 0.1N/25 mm in a state where the layer is attached to the antiglare-treated film.

In another embodiment of the present invention, the adhesive layer has a heating adhesive strength of 0.005 to 1N/25 mm in a state where the layer is attached to the antiglare film. When the adhesive strength is less than 0.005N/25 mm, the layer can be easily peeled, and when the adhesive strength exceeds 1N/25 mm, detachment may be difficult.

An embodiment of the present invention provides an image display device to which the optical film is attached.

The image display device according to one embodiment of the present invention is characterized in that the optical film is attached to the visible side surface of the image display device and the transmissive clarity is at least 240.

The type of image display device is not particularly limited, and for example, a liquid crystal display device (LCD), a plasma display device (PDP), an electroluminescence display device (EL), a cathode ray tube display device (CRT) and the like can be used.

The optical film according to an embodiment of the present invention may further include a release film on the adhesive layer.

Hereinafter, the present invention will be described in more detail by way of Examples, Comparative Examples and Experimental Examples. However, it will be apparent to those skilled in the art that these Examples, Comparative Examples and Experimental Examples are for illustrative purposes only and the scope of the present invention is not intended to be limited to these Examples.

Preparation Example 1: Preparation of a Substrate Including a Material Emitting Light by the Ultraviolet Rays A casting stock solution composed of 18.5 wt. % of a solid content containing triacetyl cellulose (TAC) as a cellulose component and a small amount of triphenyl phosphate (TPP) as a plasticizer, 0.1 wt. % of a material emitting light by the ultraviolet rays (lanthanide complex (tris(dibenzoyl methane)mono(1,10-phenanthroline)europium (III))) and 81.4 wt. % of methylene chloride solvent was extruded in the form of a sheet with a thickness of 400 μm and a width of 600 mm on the surface of the metal belt. The metal belt was rotated and moved to evaporate the solvent and form a cellulose film having a thickness of 90 μm. Then, the resulting film was dried at 120° C. to prepare the desired cellulose film.

Preparation Example 2: Preparation of a Substrate Including a Material Discolored by Ultraviolet Rays A casting stock solution composed of 18.5 wt. % of a solid content containing triacetyl cellulose (TAC) as a cellulose component and a small amount of triphenyl phosphate (TPP) as a plasticizer, 0.5 wt. % of a material discolored by the ultraviolet rays (spiropyran-based compound (1',3'-dihydro-1',3',3'-trimethyl-6-nitrospiro[2H-1-benzopyran-2,2'-(2H)-indole]) and 81 wt. % of methylene chloride solvent was extruded in the form of a sheet with a thickness of 400 μm and a width of 600 mm on the surface of the metal belt. The metal belt was rotated and moved to evaporate the solvent and form a cellulose film having a thickness of 90 μm. Then, the resulting film was dried at 120° C. to prepare the desired cellulose film.

Preparation Example 3: Preparation of a Substrate Including a Material Emitting Light by the Infrared Rays 2.06 mmol of $CF_3COONa$, 0.75 mmol of $Y(CF_3COO)_3$, 0.16 mmol of $Yb(CF_3COO)_3$, 0.03 mmol of $Er(CF_3COO)_3$, 60 mmol of oleic acid, and 60 mmol of 1-octadecan were added to a round-bottomed flask in which argon gas has been purged. The solution was maintained at 120° C. for 30 minutes, heated up to 330° C. at a rate of 8 degrees per minute and cooled down to a room temperature. The cooled solution was added to an excessive amount of acetone. The nanoparticles were deposited and then centrifuged to prepare a material emitting light by the infrared rays, i.e., $NaYF_4$ nanoparticle in which 17 mol % of $Yb^{3+}$ and 3 mol % of $Er^{3+}$ were doped [see. J. Phys. Chem. C Vol. 114, No. 1, p 610-616].

A casting stock solution composed of 18.5 wt. % of a solid content containing triacetyl cellulose (TAC) as a cellulose component and a small amount of triphenyl phosphate (TPP) as a plasticizer, 0.5 wt. % of a material emitting light by the infrared rays ($NaYF_4$ nanoparticle in which 17 mol % of $Yb^{3+}$ and 3 mol % of $Er^{3+}$ were doped) and 81 wt. % of methylene chloride solvent was extruded in the form of a sheet with a thickness of 400 μm and a width of 600 mm on the surface of the metal belt. The metal belt was rotated and moved to evaporate the solvent and form a cellulose film having a thickness of 90 μm. Then, the resulting film was dried at 120° C. to prepare the desired cellulose film.

Comparative Examples 1-3

An acryl-based adhesive layer having a storage elastic modulus (G') of $1.4 \times 10^6$ and a thickness of 20 μm was formed by coating on the substrate obtained in Preparation Example 1 and then attached to a surface-treated film used in the outside surface of the visible side of the image display device and having an outside haze of 0 to 19% by surface fine-asperities to measure an initial adhesive strength, a heating adhesive strength, an appearance and a transmissive clarity in the following manner, and the results thus obtained are shown in table 1 below.

(1) Initial Adhesive Strength

The prepared specimen was cut into a size of 25 mm×100 mm, left for one hour under the conditions of 23° C. and RH 50% and then peeled at a peeling rate of 300 mm/min and a peeling angle of 180° using an universal tensile testing machine (UTM, Instron) to measure the initial adhesive strength. At this time, the measurement was made under the conditions of 23° C. and RH 50%.

(2) Heating Adhesive Strength

The heating adhesive strength was measured in the same manner as in the measurement method of the initial adhesive strength, except that the cut specimen was left for 24 hours under the condition of 50° C.

(3) Appearance

The prepared specimen was adhered to an antiglare film and then reflected with a three-wavelength stand light to evaluate the appearance based on whether the shape of stand light is clearly seen as follows:

Appearance ○: the shape of the stand light is clearly visible

Appearance X: the shape of the stand light is visually blurred (fine bubbles were generated)

(4) Transmissive Clarity

The transmissive clarity (%) of each film was measured using a transmissive clarity measuring device (ICM-1T, Suga Tester Instruments Co., Ltd.). The transmissive clarity represents an image clarity obtained by calculating the transmittance of the light which has transmitted through the film, in accordance with JIS K7105. The value of the transmissive clarity is the sum of the image clarity values measured using four types of optical lights having a slit spacing of 0.125 mm, 0.5 mm, 1.0 mm, and 2.0 mm.

Examples 1-2

An acryl-based adhesive layer having a storage elastic modulus (G') of $1.1 \times 10^5$ and a thickness of 20 μm was formed by coating on the substrate obtained in Preparation Example 1 and then attached to a surface-treated film used in the outside surface of the visible side of the image display device and having an outside haze of 5 to 19% by surface fine-asperities to measure an initial adhesive strength, a heating adhesive strength, an appearance and a transmissive clarity in the same manner as in Comparative Example 1, and the results thus obtained are shown in table 1 below.

Examples 3-4

The measurement was made out in the same manner as in Example 1, except that an acryl-based adhesive layer having a storage elastic modulus (G') of $3.7 \times 10^4$ and a thickness of 20 μm was formed by coating on the substrate obtained in Preparation Example 1, and the results thus obtained are shown in table 1 below.

Examples 5-6

The measurement was made in the same manner as in Example 1, except that a silicone-based adhesive layer having a storage elastic modulus (G') of $2.5 \times 10^3$ and a thickness of 20 μm was formed by coating on the substrate obtained in Preparation Example 1, and the results thus obtained are shown in table 1 below.

Examples 7-8

The measurement was made in the same manner as in Example 1, except that a silicone-based adhesive layer having a storage elastic modulus (G') of $4.9 \times 10^5$ and a thickness of 20 μm was formed by coating on the substrate obtained in Preparation Example 1, and the results thus obtained are shown in table 1 below.

Examples 9-10

The measurement was made in the same manner as in Example 1, except that an urethane-based adhesive layer having a storage elastic modulus (G') of $2.5 \times 10^5$ and a thickness of 20 μm was formed by coating on the substrate obtained in Preparation Example 1, and the results thus obtained are shown in table 1 below.

TABLE 1

| | Properties of surface treatment | | Properties of adhesive | | | | | |
|---|---|---|---|---|---|---|---|---|
| | Outside haze | Transmissive clarity | type | Elastic Modulus (Pa) | Initial adhesive strength | Heating adhesive strength | Appearance | Transmission clarity |
| Comparative Example 1 | 0 | 386 | Acryl-based | $1.4 \times 10^6$ | 0.11 | 0.23 | ○ | 325 |
| Comparative Example 2 | 5 | 230 | | | 0.21 | 0.48 | x | 202 |
| Comparative Example 3 | 19 | 26 | | | 0.44 | 1.0 | x | 96 |
| Example 1 | 5 | 230 | | $1.1 \times 10^5$ | 0.04 | 0.07 | ○ | 326 |
| Example 2 | 19 | 26 | | | 0.05 | 0.08 | ○ | 278 |
| Example 3 | 5 | 230 | | $3.7 \times 10^4$ | 0.04 | 0.08 | ○ | 334 |
| Example 4 | 19 | 26 | | | 0.05 | 0.08 | ○ | 325 |
| Example 5 | 5 | 230 | Silicone-based | $2.5 \times 10^3$ | 0.07 | 0.09 | ○ | 347 |
| Example 6 | 19 | 26 | | | 0.07 | 0.09 | ○ | 342 |
| Example 7 | 5 | 230 | | $4.9 \times 10^5$ | 0.06 | 0.07 | ○ | 338 |
| Example 8 | 19 | 26 | | | 0.06 | 0.07 | ○ | 336 |
| Example 9 | 5 | 230 | Urethane-based | $2.5 \times 10^5$ | 0.08 | 0.09 | ○ | 324 |
| Example 10 | 19 | 26 | | | 0.05 | 0.07 | ○ | 302 |

As seen from Table 1 above, it could be confirmed that the optical film according to the present invention had a very excellent transmissive clarity without generation of bubbles even when adhered to an antiglare film. In addition, it could be confirmed that the optical film according to the present invention had low initial adhesive strength and heating adhesive strength and thus the re-peeling was easy.

Examples 11-13 and Comparative Examples 4-6

When the refractive index of the substrate was within a range of 1.2 to 1.8, the refractive index of the adhesive layer was 1.5, and the refractive index of the antiglare layer used for the visible side surface of the image display device to which the adhesive layer was attached was 1.5, the intensity of the light which was emitted from the photoluminescent material included in the substrate and received in the front direction of the visible side was calculated, and the results thus obtained are shown in Table 2 below.

Comparative Example 7

The calculation was made in the same manner as in Example 11, except that the refractive index of the substrate was 1.7, and the refractive index of the adhesive layer was 1.7.

TABLE 2

| | Refractive index of substate | Refractive index of adhesive layer | Refractive index of antiglare layer | Light intensity |
|---|---|---|---|---|
| Example 11 | 1.2 | 1.5 | 1.5 | 24.5 |
| Example 12 | 1.3 | | | 20.3 |
| Example 13 | 1.4 | | | 16.5 |
| Comparative Example 4 | 1.5 | | | 13.8 |
| Comparative Example 5 | 1.6 | | | 11.7 |
| Comparative Example 6 | 1.8 | | | 8.8 |
| Comparative Example 7 | 1.7 | 1.7 | | 10.1 |

As seen from Table 2, the optical film according to the present invention could further improve the visibility of the laser pointer by making the refractive index of the adhesive layer to be higher than the refractive index of the substrate and making the difference in refractive index to be 0.1 to 0.3, thereby increasing the light intensity.

Example 14

An acryl-based adhesive layer having a storage elastic modulus (G') of $1.1 \times 10^5$ and a thickness of 20 μm was formed by coating on the substrate obtained in Preparation Example 1 and then attached to the visible side of LCD (Liquid Crystal Display) to which a surface-treated film having an outside haze of 19% was attached to evaluate the visibility of point, and the results thus obtained are shown in table 3 below.

(1) Evaluation of Visibility of Point

For evaluating the visibility of the position to which ultraviolet or infrared light sources are pointed, the position visibility by the naked eye was evaluated under the following criteria.

○: visually well recognized.
X: never visually recognized.

Example 15

The evaluation was made in the same manner as in Example 14, except that the adhesive was coated on the substrate obtained in Preparation Example 2, and the results thus obtained are shown in table 3 below.

Example 16

The evaluation was made in the same manner as in Example 14, except that the adhesive was coated on the substrate obtained in Preparation Example 3, and the results thus obtained are shown in table 3 below.

Comparative Example 8

The cellulose film was prepared in the same manner as in Preparation Example 1, except that a casting stock solution composed of 0.0005 wt. % of the material emitting light by the ultraviolet rays (lanthanide complex (tris(dibenzoyl methane)mono(1,10-phenanthroline)europium (III))) was used. The evaluation was made in the same manner in Example 14, and the results thus obtained are shown in Table 3 below.

TABLE 3

|  | Laser intensity (mW/mm$^2$) | | |
| --- | --- | --- | --- |
|  | 0.5 | 1 | 2 |
| Example 14 | ○ | ○ | ○ |
| Example 15 | ○ | ○ | ○ |
| Example 16 | ○ | ○ | ○ |
| Comparative Example 8 | x | x | x |

As seen from Table 3, it could be confirmed that in the case of Examples 14 to 16 using, as a photoluminescent material, the material emitting light by the ultraviolet rays, the material discolored by the ultraviolet rays and the material emitting light by the infrared rays, respectively, the visibility was excellent, but in the case of Comparative Example 8 in which a small amount of photoluminescent material was used, the point was not visually recognized.

Although particular embodiments of the present invention have been described in detail, it will be obvious to those skilled in the art that these are only preferred embodiments and the scope of the present invention is not intended to be limited to thereto. Also, those skilled in the art will understand that various changes and modifications may be made to the invention without departing from the spirit and scope of the invention. The scope of the present invention, therefore, is to be defined by the appended claims and equivalents thereof.

The invention claimed is:

1. An optical film comprising
a substrate including a photoluminescent material and
an adhesive layer formed on one surface of the substrate,
wherein the refractive index of the adhesive layer is larger than the refractive index of the substrate, and the difference in refractive index between the adhesive layer and the substrate is within a range of 0.1 to 0.3.

2. The optical film of claim 1, wherein the photoluminescent material is a material emitting light by ultraviolet rays and the maximum excitation wavelength thereof is within a range of 300 to 450 nm.

3. The optical film of claim 1, wherein the photoluminescent material is a material discolored by ultraviolet rays and the maximum excitation wavelength thereof is within a range of 300 to 450 nm.

4. The optical film of claim 1, wherein the photoluminescent material is a material emitting light by infrared rays and the maximum excitation wavelength thereof is within a range of 700 to 1600 nm.

5. The optical film of claim 1, wherein the adhesive layer has a storage elastic modulus (G') at 23° C. of $1.0 \times 10^3$ Pa to $1.0 \times 10^6$ Pa.

6. The optical film of claim 1, wherein the adhesive layer is formed of an adhesive composition comprising an adhesive resin, a crosslinking agent and an additive.

7. The optical film of claim 6, wherein the adhesive resin is an acryl-based copolymer, an urethane-based copolymer or a silicone rubber.

8. The optical film of claim 1, wherein an initial adhesive strength of the adhesive layer is 0.005 to 0.1 N/25 mm in a state where the adhesive layer is attached to an antiglare film.

9. The optical film of claim 1, wherein a heating adhesive strength of the adhesive layer is 0.005 to 1 N/25 mm in a state where the adhesive layer is attached to an antiglare film.

10. An image display device comprising the optical film according to claim 1.

11. The image display device of claim 10, wherein a transmissive clarity of the image display device is at least 240.

12. The optical film of claim 1 further comprising a release film on the adhesive layer.

* * * * *